March 19, 1963  E. A. WENTZ  3,082,134
HOLLOW ARTICLES AND METHOD OF MAKING THE SAME
Filed July 10, 1958
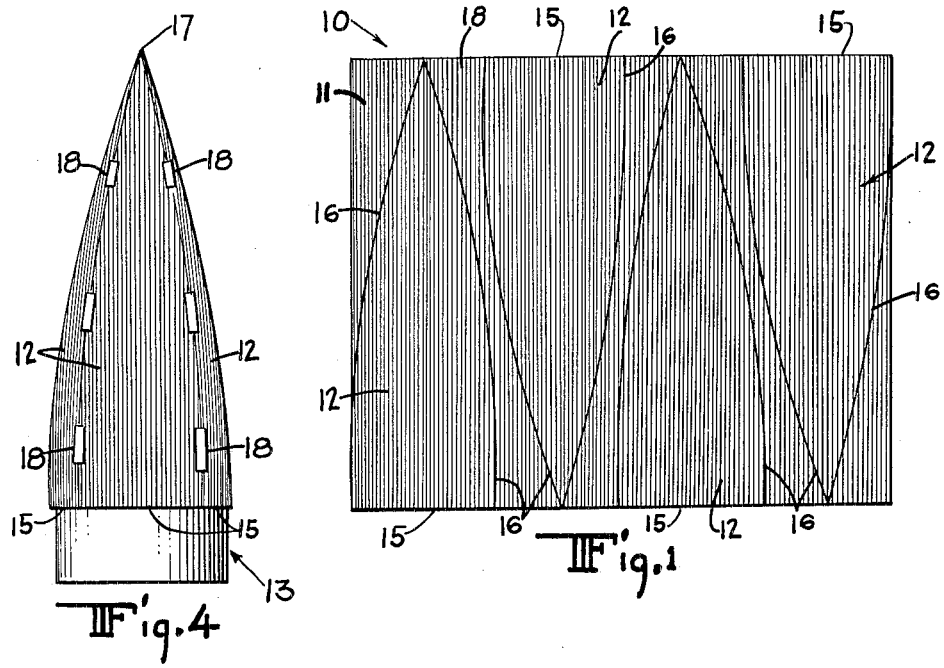
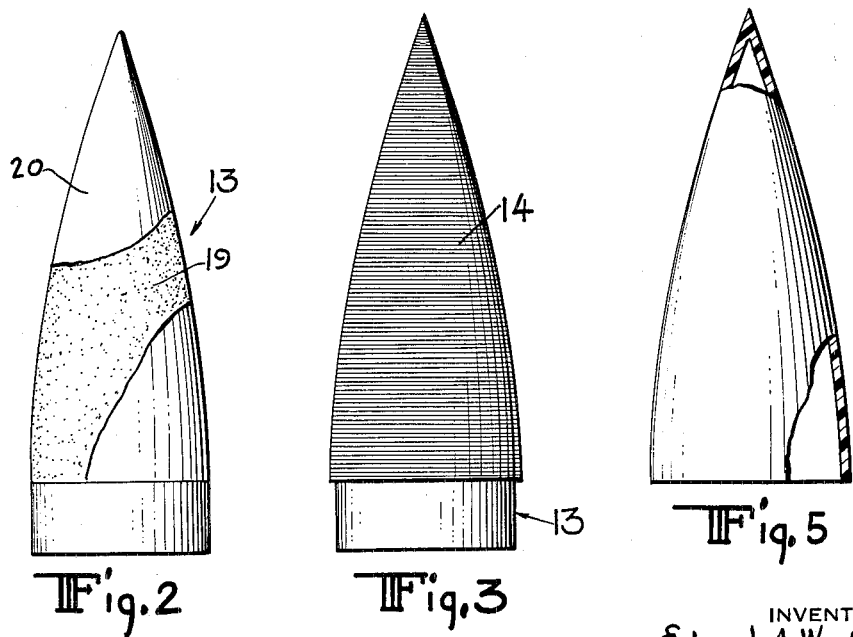
INVENTOR
Edward A. Wentz
BY
J. William Carson
ATTORNEY United States Patent Office 3,082,134
Patented Mar. 19, 1963

3,082,134
HOLLOW ARTICLES AND METHOD OF
MAKING THE SAME
Edward A. Wentz, Cedar Grove, N.J., assignor to Specialties Development Corporation, Belleville, N.J., a corporation of New Jersey
Filed July 10, 1958, Ser. No. 747,756
6 Claims. (Cl. 154—43)

The present invention relates to generally conical hollow articles, and, more particularly to radar domes and the like for housing or shielding electronic equipment such as radar antennas mounted on aircraft or missiles.

Radar domes, in order to accomplish their intended function, must be highly permeable to radio frequencies in any desired range, must have high structural strength and rigidity and yet be light in weight, must be weather resistant and moisture tight and must be capable of being subjected to temperature changes over wide ranges.

Accordingly, the principal object of the present invention is to provide generally conical or ogival articles which meet the aforementioned requirements and are therefore suitable for use as radar domes or for other purposes where such requirements may be desirable.

Another object is to provide such hollow articles which can be manufactured in a simple, rapid and economical manner.

A further object is to facilitate the removal of the articles from the mandrel.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by applying closely adjacent hoop windings of freshly resin impregnated fiber glass yarn on a generally conical or ogival mandrel, placing a group of generally triangular or ogival weft-less sheet portions having warp strands on the hoop windings to substantially cover the same, with the warp threads disposed in planes extending through the mandrel axis and with the base edges of the sheet portions extending about the mandrel and the side edges of adjacent sheet portions being closely adjacent each other from the base edge to the apex or point of each sheet portions, the sheet portions being formed of resin impregnated warp-wise extending fiber glass strands adhered to each other and being in gel-cured state to manitain the sheet portions pliable, placing successive and preferably alternate layers of groups of hoop windings and sheets onto each other, the last layer being hoop windings, to build up a wall having a thickness and sufficient strength to produce a self sustaining article adapted to maintain its shape, removing the article from the mandrel, and post-curing the article to harden the wall thereof and to bond the layers.

A preferred embodiment of the invention has been chosen for purposes of illustration and description, and is shown in the accompanying drawing, forming a part of the specification, wherein:

FIG. 1 is a plan view of a sheet of weft-less material having a group of sheet portions outlined thereon.

FIG. 2 is a plan view of a mandrel.

FIG. 3 is a plan view with a layer of hoop windings applied on the mandrel.

FIG. 4 is a plan view with the group of sheet portions arranged on the layer of hoop windings to provide a layer of longitudinal strands.

FIG. 5 is a plan view of the finished article with portions broken away.

Referring to the drawing in detail, a weft-less sheet 10 is shown in FIG. 1 which comprises resin impregnated fiber glass warp strands 11 adhered lengthwise to each other. Preferably, the sheet is gel-cured, that is partially cured, to maintain it in pliable condition.

The sheet 10 is cut into a group of portions 12 outlined on the sheet which are generally triangular, for example, ogival as shown, and are dimensioned so that they can be placed on an ogival mandrel 13 to substantially cover the mandrel (FIGS. 2 to 4) with the warp threads extending in the direction of the mandrel axis. In order to provide for uniform stress resistance in the finished article, at least two sheet portions 12 constitute the group so that nearly all the warp strands lie in planes passing through the mandrel axis. As shown herein, for example, four sheet portions are utilized to provide the group, although a greater number of sheet portions may be utilized where the article has a higher diameter to length ratio.

The mandrel 13 is mounted on a shaft for rotating the same about its axis (not shown), and, upon rotation of the mandrel, a layer of closely adjacent hoop windings 14 of freshly resin impregnated fiber glass yarn is applied (FIG. 3) to cover the mandrel by a slowly moving traverse (not shown) to wind the yarn from the point of the mandrel to its base end or vice versa. One or more layers of hoop windings can be applied over the sheet portions with the convolutions disposed in planes perpendicular to the planes in which the warp strands are disposed.

The sheet portions 12 are placed on the layer of hoop windings 14 covering the mandrel with their base edges 15 extending about the mandrel 13 and their side edges 16 closely adjacent the side edges of adjacent sheet portions from the base edges 15 to the points 17 of the sheet portions. The sheet portions 12 are attached to the mandrel and to each other to provide an ogival layer or envelope by fastening means, such as one or more strips of contact adhesive tape 18, which are applied to the sheet portions 12 across the outer surface adjacent the side edges 16, as shown in FIG. 4.

Successive, preferably alternate layers of hoop windings 14 and sheet portions 12 thereafter are applied onto each other in the aforementioned manner, the last being a layer of hoop windings, to build up a wall having a thickness and sufficient strength for the purpose desired.

As a succeeding layer of hoop windings is applied over a layer of sheet portions and the winding progresses, the fastening means 18 are removed to enable the hoop windings to be directly applied on the sheet portions and hold the sheet portions in place where the windings already have been applied. The seams provided by the adjacent edges 16 of successive groups of sheet portions are staggered with respect to the seams of the preceding group, that is, they are disposed in different radial planes.

The article, shown in FIG. 5, is then removed from the mandrel 13, and is post-cured, that is cured at a temperature and for a duration of time to set the resin to harden the wall and bond the layers together.

It has been found that several expedients may be resorted to, separately or in conjunction with each other, in order to facilitate removal of the articles from the mandrel. As shown in FIG. 2, a film 19 of parting agent of the type used in molding articles formed of resins is applied to the mandrel to assist releasing the inner walls of the articles, and, preferably although not necessarily, resin is sprayed over the film 19, and is dried by applying heat within the mandrel to partially cure the resin and form a skin 20 on which the first layer of hoop windings has been applied. This skin is transferred to the inner wall of the article and is removed therewith from the mandrel to provide the article with a smooth internal surface.

It has also been found desirable to apply the first layer of hoop windings under very light tension so as not to cut through the skin 20, whereby the article can be removed without damage to the first layer of hoop windings.

Another expedient which can be utilized is to heat the mandrel and gel-cure the resin in the hoop windings and thereby give the article greater initial strength and resistance to deformation upon removal from the mandrel. Such heating may take place as the windings are being applied or only for a period just prior to removal of the article. The application of heat during the winding operation drives off volatile materials in the resins which, if trapped, would form blisters upon post curing.

These expedients can be employed for removing articles of other shapes from mandrels.

A specific example of making hollow articles in accordance with the present invention comprises cutting groups of four sheet portions 12, dimensioned to fit a mandrel having a length of about 30 inches, and a diameter at the base of about 12 inches, from a sheet 10 containing one layer of warp strands 11 which has been gel-cured at about 180° F. for a sufficient duration to adhere the strands but maintain the sheet pliable.

The parting agent may be a grease-like substance consisting essentially of soap and bentonite over which resin can be sprayed and cured at about 220° F. for a sufficient duration to provide a skin of resin.

Alternate single layers of hoop windings and sheet portions were applied to the mandrel as previously described to provide a wall thickness of about .300 inch. This was accomplished by applying four layers of hoop windings and three layers of sheet portions, the first and last layers being hoop windings.

The fiber glass yarn in the sheet portions and the windings contained a coupling agent or binder to improve its bond to the resin. The resin utilized for adhering the warp strands, coating the mandrel and impregnating the hoop winding yarn was triallyl cyanurate, a polyester resin of the heat resisting type.

In order to gel-cure the hoop windings, the mandrel was heated internally at about 180° F. throughout the hoop winding and sheet portion applying operations and at the completion of these operations the article, while on the mandrel, was heated for about five hours at about 250° F.

A satisfactory manner of post-curing the articles, comprises first heating the articles for about six hours at about 300° F. and then heating the articles for about sixteen hours at about 400° F.

From the foregoing description, it will be seen that the present invention provides a novel and improved method of making hollow articles of fiber glass and resin and better hollow articles so produced.

It will be understood that the details and examples hereinafter set forth are illustrative only and that the invention as broadly described and claimed is in no way limited thereby.

I claim:

1. The method of making a generally conical hollow article, which method comprises applying closely adjacent hoop windings of freshly resin impregnated fiber glass yarn on a generally conical mandrel, attaching a group of at least two generally triangular weft-less sheet portions having warp strands to the layer of hoop windings, with the warp strands disposed in planes extending through the mandrel axis and with the base edges of the sheet portions extending about the mandrel and the side edges of the adjacent sheet portions being closely adjacent each other from the base edge to the apex of each sheet portion to substantially cover the layer of hoop windings, said sheet portion being formed of resin impregnated warpwise extending fiber glass strands adhered to each other and being in gel-cured state to maintain the sheet portions pliable, placing successive hoop windings and groups of sheet portions onto each other, the last layer being hoop windings, to build up a wall having a thickness and sufficient strength to produce a self sustaining article adapted to maintain its shape, removing the article from the mandrel, and post-curing the article to harden the wall thereof and bond the layers.

2. The method of making a hollow ogival article, which method comprises applying closely adjacent hoop windings of freshly resin impregnated fiber glass yarn on an ogival mandrel, attaching a group of four ogival weft-less sheet portions having warp strands to the layer of hoop windings, with the warp strands disposed in planes extending through the mandrel axis and with the base edges of the sheet portions extending about the mandrel and the side edges of adjacent sheet portions being closely adjacent each other from the base edge to the point of each sheet portion to substantially cover the layer of hoop windings, said sheet portions being formed of resin impregnated warpwise extending fiber glass strands adhered to each other and being in gel-cured state to maintain the sheet portions pliable, placing a plurality of alternate layers of hoop windings and groups of sheet portions onto each other, to build up a wall having a thickness and sufficient strength to produce a self sustaining article adapted to maintain its shape, removing the article from the mandrel, and post-curing the article to harden the wall thereof and bond the layers.

3. The method of making a generally conical hollow article, which method comprises applying closely adjacent hoop windings of freshly resin impregnated fiber glass yarn on a generally conical mandrel, placing a group of at least two generally triangular weft-less sheet portions having warp strands over the layer of hoop windings, with the warp strands disposed in planes extending through the mandrel axis and with the base edges of the sheet portions extending about the mandrel and the side edges of adjacent sheet portions being closely adjacent each other from the base edge to the apex of each sheet portions to substantially cover the layer of hoop windings, applying fastening means to the adjacent edges to attach the sheet portions on the mandrel, said sheet portions being formed of resin impregnated warpwise extending fiber glass strands adhered to each other and being in gel-cured state to maintain the sheet portions pliable, applying another layer of closely adjacent hoop windings of freshly resin impregnated fiber glass yarn on the group of sheet portions to cover the same and removing the fastening means as the windings progress, placing successive layers of hoop windings and sheet portions onto each other in the same manner, the last layer being hoop windings, to build up a wall having a thickness and sufficient strength to produce a self sustaining article adapted to maintain its shape, removing the article from the mandrel, and post-curing the article to harden the wall thereof and bond the layers.

4. A generally conical hollow article comprising a plurality of layers of a group of at least two generally triangular weft-less sheet portions having warp strands disposed in planes extending through the longitudinal axis of the article with the base edges circularly arranged and the side edges of adjacent sheet portions being closely adjacent each other from the base edge to the apex of each sheet portions to provide a generally conical layer, said sheet portions being formed of resin impregnated warpwise extending fiber glass strands, and a plurality of layers of hoop windings of resin impregnated fiber glass yarn, said resin being cured to harden the same and adhere said layers, said layers of sheet portions and hoop windings being alternately arranged with the first and last layers being hoop windings, there being a sufficient number of layers to build up a wall having thickness and strength to produce a self sustaining article adapted to maintain its shape.

5. A hollow ogival radar dome comprising a plurality of layers of a group of four ogival weft-less sheet portions having warp strands disposed in planes extending through the longitudinal axis of the dome with the base edges circularly arranged and the side edges of adjacent sheet portions being closely adjacent each other from the base edge to the point of each sheet portion to provide an ogival layer, said sheet portions being formed of resin impregnated warpwise extending fiber glass strands, and a plurality of layers of hoop windings of resin impregnated fiber glass yarn, said resin being cured to harden the same and adhere said layers, said layers being alternately arranged with the first and last layers being hoop windings, there being a sufficient number of layers to build up a wall having thickness and strength to produce a self sustaining dome adapted to maintain its shape.

6. A generally conical hollow article comprising a plurality of layers of a group of at least two generally triangular weft-less sheet portions having warp strands disposed in planes extending through the longitudinal axis of the article with the base edges circularly arranged and the side edges of adjacent sheet portions being closely adjacent each other from the base edges to the apex of each sheet portion to provide a generally conical layer, said sheet portions being formed of resin impregnated warpwise extending fiber glass strands, and a plurality of layers of hoop windings of resin impregnated fiber glass yarn, said resin being cured to harden the same and adhere said layers, said layers being alternately arranged with the first and last layers being hoop windings, there being a sufficient number of layers to build up a wall having thickness and strength to produce a self sustaining article adapted to maintain its shape, said article having a thin continuous layer of cured resin on the inner wall thereof.

References Cited in the file of this patent
UNITED STATES PATENTS

| | | |
|---|---|---|
| 2,420,488 | Marhoefer et al. | May 13, 1947 |
| 2,726,185 | Howald | Dec. 6, 1955 |
| 2,749,643 | Scott | June 12, 1956 |
| 2,782,833 | Rusch | Feb. 26, 1957 |
| 2,817,619 | Bickel et al. | Dec. 24, 1957 |
| 2,905,578 | Rees et al. | Sept. 22, 1959 |

OTHER REFERENCES

British Plastics, vol. 24, December 1951, pp. 415–420.